(12) United States Patent
Mowery et al.

(10) Patent No.: US 7,240,189 B2
(45) Date of Patent: Jul. 3, 2007

(54) FAST RESUME TO NORMAL OPERATION OF A COMPUTER IN A POWER SAVING MODE

(75) Inventors: Keith R Mowery, Plano, TX (US); Jeffrey H Enoch, McKinney, TX (US); David N King, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 68 days.

(21) Appl. No.: 10/669,840

(22) Filed: Sep. 24, 2003

(65) Prior Publication Data
US 2005/0066158 A1 Mar. 24, 2005

(51) Int. Cl.
*G06F 15/177* (2006.01)
(52) U.S. Cl. .......................... 713/2; 713/300
(58) Field of Classification Search .............. 713/2, 713/300
See application file for complete search history.

(56) References Cited

U.S. PATENT DOCUMENTS 5,862,393 A * 1/1999 Davis .................... 713/300
6,954,851 B2 * 10/2005 Natu ......................... 713/2
2002/0073358 A1 * 6/2002 Atkinson ................... 714/21
2002/0087816 A1 * 7/2002 Atkinson et al. .......... 711/156
2003/0084239 A1 * 5/2003 Stewart ..................... 711/113

* cited by examiner

*Primary Examiner*—Thomas Lee
*Assistant Examiner*—Vincent Tran
(74) *Attorney, Agent, or Firm*—William B Kempler; W. James Brady, III; Frederick J. Telecky, Jr.

(57) ABSTRACT

A fast resume of a computer from a low power mode to a normal operating mode captures a power down message from the operating system of the computer to devices connected thereto. In response to the captured message, the device manager is instructed to remove the device from the operating system. The computer is powered down with the device removed. The system is later powered up with the device removed, allowing for faster resume to normal operation. After the computer has returned to normal operation, the device manager reinstates the removed device. The program to capture the power down message can be above the device driver in the driver stock or be an application running in the user mode of the operating system.

15 Claims, 1 Drawing Sheet

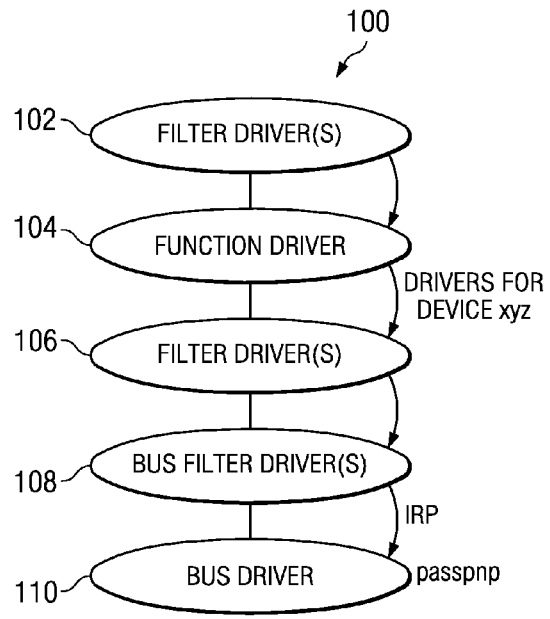
FIG. 1
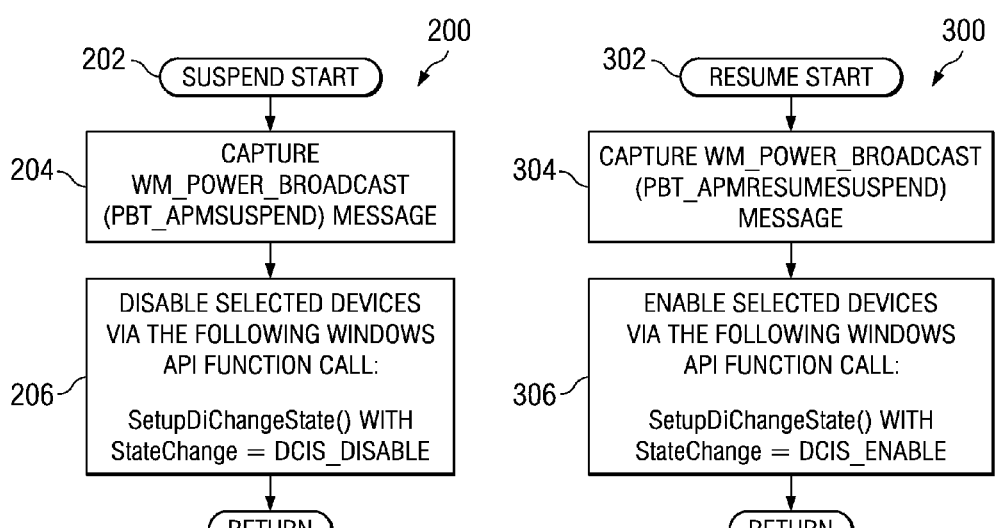
FIG. 2
FIG. 3 under, under, under. US 7,240,189 B2

FAST RESUME TO NORMAL OPERATION OF A COMPUTER IN A POWER SAVING MODE

FIELD OF THE INVENTION

The present invention relates generally to computers, including desktop and portable (laptop) computers and more particularly to a fast resume to normal operation from a power saving mode.

BACKGROUND OF THE INVENTION

Modern computer operating systems employ power management techniques to minimize the power utilized by the computer, operates the computer and its peripheral devices at the lowest feasible power level to accomplish the task on hand, and reduce noise. In portable (laptop) computers, power management is designed to improve the battery life and performance may be sacrificed in this regard. Similarly, if a computer system is on a battery-powered backup device, minimizing power consumption is essential in order that the computer remain operable until the AC mains power is restored. However, even in computers operating from the AC mains, energy conservation has become an important capability of the computer operating system. Given the large number of computers that may be operating at one time for a particular employer, for example, the power savings can save significant costs for electrical energy. In addition, the thermal load on the computer will be reduced, thereby increasing its reliability. Furthermore, with unused devices shut down, the noise generated by the system can be reduced.

In a system such as Microsoft Windows®, for example, there are five levels of system power state definitions:

| Power Level | Work State or Sleep | Description |
| --- | --- | --- |
| S0 | Working | The system is on. The CPU is fully up and running and power conservation is on a per-device basis. |
| S1 | Sleep | The system appears off. The CPU is stopped; RAM is refreshed; and the system is running in a low power mode. |
| S2 | Sleep | The system appears off. The CPU has no power; RAM is refreshed; the system is in a lower power mode than S1. |
| S3 | Sleep | The system appears off. The CPU has no power; RAM is in a slow refresh mode; and the power supply is in a reduced power mode. |
| S4 | Hibernate | The system appears off. The hardware is completely off, but system memory has been saved to disk. |
| S5 | Off | The system is off. The hardware is completely off, the operating system has shut down; nothing has been saved. Requires a complete reboot to return to the working state S0. |

In several of the power states, the user can hit any key or move his mouse in order to restore the system to the working state. In other lower power modes, the user may have to push a specified button in order to restore normal operation. In the S5 (off) state, the user would have to hit the power button in order to reboot the computer into its normal operation. Once the user has taken this action, the user would like the system to return to normal operation or "resume" very rapidly. A current requirement on the operating system is being resumed from standby to being able to see that start button on the display within 3.5 seconds. However, as drivers become more complicated such as gigabit Ethernet drivers and wireless Lan drivers, this task is becoming more complicated. In fact, if one utilizes certain flash media cards with a laptop computer, it takes more than 10 seconds for the laptop computer to return to normal operation from the low power state.

One technique that has been proposed is that the driver handle system interrupts (S-IRPS) and device interrupts (DIRPS) to correctly plug and play and power up a device. Normal resume from standby requires that a driver handle both interrupts. However, the device interrupts usually take the longest amount of time. In some drivers, it may be possible to create a fast-resume by handling the system interrupts first and then create a call back so that the power management driver will finish with all of the other drivers in the operating system and then bring the video on line. After this is completed, the power management driver will then call back to the device driver so that it can complete the device interrupts. In addition to there being no current documentation on how this approach might work, not all drivers can implement this function. Drivers such as video, Lan, storage and smartcard drivers have difficulty implementing this type of operation because they have time critical device initialization that will have to be performed before the operating system can come up. Furthermore, many drivers already in the operating system do not have this function. It would take a lot of time and therefore be costly to make these drivers compatible with this scheme. In addition, laptop computers going into such low power modes utilizing this scheme become confused because while the driver is trying to handle d-rips to come out of standby or to go into hibernate, the power management system tries to pass down power management commands to go into hibernate. The driver tries to tell the operating system that it can not at this time go into hibernate and the operating system will detect an error.

Accordingly, there is a need for a faster way to resume normal operation from a low power state.

SUMMARY OF THE INVENTION

A general object of the present invention is to provide a faster resume to normal operation of a computer from a low power mode.

This and other objects and features are provided, in accordance with one aspect of the invention by a method for improving the startup speed of a computer operating system from a suspended state to an active state. A computer application runs in the operating system to capture a predetermined message issued by the computer operating system. A command, is sent in response to the captured message, from the application to a device manager in the operating system to remove a device to be powered down, from the operating system. The computer is powered down. The computer is restarted with the device removed from the operating system. The device is reinstated in the operating system after the computer has been restarted.

Another aspect of the invention includes a method for improving the startup speed of a computer operating system from a suspended state to an active state. A computer device stack filter driver runs to capture a predetermined message issued by the computer operating system. A command, is sent in response to the captured message, from the filter driver to a device manager in the operating system to remove a device to be powered down from the operating system. The computer is powered down. The computer is restarted with the device removed from the operating system. The device is reinstated in the operating system after the computer has been restarted.

A further aspect of the invention comprises a computer having improved startup speed from a suspended state to an active state. A microprocessor is controlled by an operating system. An application is stored in a memory of the computer for running within the operating system to capture a predetermined message issued by the operating system, the application sending a command, in response to the captured message, to a device manager within the operating system to remove a device to be powered down, from the operating system. Means powers down the computer system. Means restarts the computer with the device removed from the operating system. Means reinstates the device in the operating system after the computer has been restarted.

Yet another aspect of the invention is provided by a computer program stored on computer readable media. Means captures a suspend message from an operating system. Means issues a command in response to the captured message to a device manager of the operating system to remove a device to be powered down, from the operating system. Means reinstates the device in the operating system after a computer has been powered down and restarted with the device removed.

BRIEF DESCRIPTION OF THE DRAWINGS

FIG. 1 is a flow chart for a first embodiment of the present invention;

FIG. 2 is a flow chart for the suspend portion of a second embodiment of the present invention; and FIG. 3 is a flow chart for the resume portion of the second embodiment of the present invention.

DETAILED DESCRIPTION OF THE PRESENT INVENTION

A first embodiment of the present invention is shown in FIG. 1 generally as 100. In FIG. 1, the driver stack 100 comprises filter drivers 102, function driver 104, filter drivers 106, bus filter driver 108 and bus driver 110. With the exception of the filter drivers 102 or 106, filter stacks for device drivers such as that shown in FIG. 1 are well known in the art and need not be described in detail here. In this embodiment of the invention an upper filter driver is created on all of the plug and play bus drivers. Plug and play bus drivers can be the PCI, USB, ACPI, IEEE 1394, or PCM-CIA. By utilizing upper filter drivers such as filter driver 102 or 106, the driver can catch the power management IRP coming down from the ACPI.sys I/O subsystem and the plug and play subsystem. It would unload the functions below the plug and play bus driver by disabling them when a low power mode is required and then enabling them when coming out of the low power mode. This can be done by sending a message to the plug and play device manager to remove this device from the list of devices in the system and then restoring them after the system has returned from the low power mode and is in the normal operating mode. The device drivers themselves would not need to be updated or changed and therefore would not need to be requalified. In addition, some of the IRPs may need to pass through the filter drivers because those functions cannot be unloaded from the system. Two examples of this type of functionality are the video drivers and the security drivers. The video driver must remain in the system because the video is needed to immediately come up once the system has been restored to a working mode. Security drivers are very similar to video drivers in that a secure PIN is usually needed to resume the system.

In order to implement this embodiment, a set of installation files will install the filter driver into the correct location above all of the plug and play bus drivers such as PCI.sys. This set of files will also locate all drivers in the system that interact with plug and play bus drivers such as an IEEE 1394 digital camera. The user will be asked to determine which driver should be included in the filter driver scheme; the other drivers will not be changed. The names of the drivers included in the scheme will be saved in a text file or in the registry.

A filter driver will be created that sits above all the plug and play bus drivers such as PCI.sys. When a power request comes down from the power management subsystem, the upper filter driver TIFLT.sys will disable the driver saved in the text file or registry. Thus, they are removed from the device manager. The system will then proceed into a low power mode without these devices being attached to the system. As far as the system is concerned, it is the same as if the devices were physically disabled and removed from the system. The TIFLT.sys driver can actually disable these drivers by sending down enable/disable I/O commands to all the plug and play bus drivers such as PCI.sys which has supreme control over the drivers and functions attached to the plug and play bus drivers such as PCI.sys. When the user takes the system out of the low power mode, it will not try to resume these drivers that have been disabled and thus will resume normal operation very quickly. The filter driver TIFLT.sys will create a time callback return that will cause the power management to call TIFLT.sys within one or two seconds after the system has completely been restored to the normal operating mode. This time can be configured in the registry. The driver would not unload each of the software drivers for each function, because this would cause an unneeded message to the user that the function is being removed. TIFLT.sys will then be called and it will start to enable each driver/function one by one in the background. The user will never see the driver as being enabled. The driver will not load the software driver because this would cause an unwanted message to the user. The driver/function that has been enabled would act in the same way that it normally functions when being enabled by a user manually through the device manager.

FIGS. 2 and 3 show a second embodiment of the present invention in which the device drivers do not have to be changed which eliminates need for requalification. FIG. 2 illustrates the system entering a low power state and FIG. 3 illustrates the system returning from the low power state to the normal state. In this embodiment, an application or service that runs in the user mode portion of operating system is created. This new application does not affect the operation of the drivers. As shown in FIG. 2 for a Windows operating system, when the system is going to enter a low power mode, it broadcasts a message WM_POWER_BROADCAST (PBT_APM SUSPEND) message. The application will capture this message and then disable the devices utilizing the following Windows API function call: SetupDIchangeState ( ) with the StateChange being equal to DCIS_DISABLE. This will accomplish the same function as in the first embodiment in that the system will shut down without these devices being considered to be attached to the operating system. When it is time for the system to come out of the low power mode, the system would be restored to its working state with these devices still being disabled. Once the system is in its operating state, the application would receive a resume notification and would then reenable all the drivers that had previously been disabled. As shown in FIG. 3 at 304, it would do this by capturing the WM_POWER_BROADCAST (PBT_APMRESURESUSPEND) message. It will then enable the selected devices via the Windows API function call: SetupDIChangeState ( ) with the StateChange being equal to DCIS_ENABLE.

Although the application is running in user mode, the user need take no action to start or stop this process. Accordingly, no icon would appear on the desktop and the user need not be aware a program exists at all. It is also possible to give the user the ability to select the devices that will be disabled when the system goes into the low power mode, in order to give the user flexibility over hardware changes that may be made to the system.

While the invention has been shown and described with reference to preferred embodiments thereof, it is well understood by those skilled in the art that various changes and modifications can be made in the invention without departing from the spirit and scope of the invention as defined by the appended claims. For example, although the present invention has been illustrated utilizing a Microsoft Windows operating system, those skilled in the art will recognize that the invention could be equally applied to any operating system having a function similar to the plug and play function.

The invention claimed is:

1. A method for improving the startup speed of a computer operating system from a suspended state to an active state, comprising:
   running a computer application in the operating system to capture a predetermined message issued by the computer operating system;
   sending a command, in response to the captured message, from the application to a device manager in the operating system to remove a device to be powered down, from the operating system;
   powering down the computer;
   restarting the computer with the device removed from the operating system; and
   reinstating the device in the operating system after the computer has been restarted, wherein the device is chosen from the group consisting of a cardbus controller, a sound card controller, a USB media reader controller, a secondary hard drive controller, or an IEEE 1394 controller.

2. The method of claim 1 wherein the predetermined message is a suspend message.

3. The method of claim 2 wherein the suspend message is WM_POWER_BROADCAST (PBT_APMSUSPEND).

4. The method of claim 1 wherein the device manager is a plug and play manager.

5. The method of claim 2 wherein the device manager is a plug and play manager.

6. The method of claim 3 wherein the device manager is a plug and play manager.

7. A method for improving the startup speed of a computer operating system from a suspended state to an active state, comprising:
   running a computer device stack filter driver to capture a predetermined message issued by the computer operating system;
   sending a command, in response to the captured message, from the filter driver to a device manager in the operating system to remove a device to be powered down from the operating system;
   powering down the computer;
   restarting the computer with the device removed from the operating system; and
   reinstating the device in the operating system after the computer has been restarted, wherein the device is chosen from the group consisting of a cardbus controller, a sound card controller, a USB media reader controller, a secondary hard drive controller, or an IEEE 1394 controller.

8. The method of claim 7 wherein the predetermined message is a suspend message.

9. The method of claim 8 wherein the suspend message is IRP_MN_QUERY_POWER.

10. The method of claim 7 wherein the device manager is a plug and play manager.

11. A computer having improved startup speed from a suspended state to an active state comprising:
    a microprocessor being controlled by an operating system;
    an application stored in a memory of the computer for running within the operating system to capture a predetermined message issued by the operating system, the application sending a command, in response to the captured message, to a device manager within the operating system to remove a device to be powered down, from the operating system;
    means for powering down the computer system;
    means for restarting the computer with the device removed from the operating system; and
    means for reinstating the device in the operating system after the computer has been restarted, wherein the device is chosen from the group consisting of a cardbus controller, a sound card controller, a USB media reader controller, a secondary hard drive controller, or an IEEE 1394 controller.

12. The computer of claim 11 wherein the predetermined message is a suspend message.

13. The computer of claim 12 wherein the suspend message is WM_POWER_BROADCAST (PBT_APMSUSPEND).

14. The computer of claim 11 wherein the device manager is a plug and play manager.

15. A computer program stored on computer readable media comprising:
    means to capture a suspend message from an operating system;
    means to issue a command in response to the captured message to a device manager of the operating system to remove a device to be powered down, from the operating system;
    means for reinstating the device in the operating system after a computer has been powered down and restarted with the device removed, wherein the device is chosen from the group consisting of a cardbus controller, a sound card controller, a USB media reader controller, a secondary hard drive controller, or an IEEE 1394 controller.

* * * * *